United States Patent [19]
Furukawa et al.

[11] Patent Number: 5,216,708
[45] Date of Patent: Jun. 1, 1993

[54] CALLING SIGNAL CONTROLLER

[75] Inventors: Tetsuo Furukawa; Masami Nashirozawa, both of Yokohama, Japan

[73] Assignee: Matsushita Electric Industrial Co., Ltd., Osaka, Japan

[21] Appl. No.: 725,431

[22] Filed: Jul. 3, 1991

[30] Foreign Application Priority Data

Jul. 9, 1990 [JP] Japan .................. 2-180823

[51] Int. Cl.⁵ .................. H04M 9/00; H04M 1/72
[52] U.S. Cl. .................. 379/165; 379/159; 379/172; 379/173; 379/254
[58] Field of Search .............. 379/164, 165, 373, 159, 379/172, 173, 254, 280

[56] References Cited
U.S. PATENT DOCUMENTS 4,602,132 7/1986 Nagatomi et al. .................. 379/159
4,605,824 8/1986 Birlmeier et al. .................. 379/254

FOREIGN PATENT DOCUMENTS

0051495 5/1982 European Pat. Off. .
0416803 3/1991 European Pat. Off. .
1199749 7/1970 United Kingdom .

Primary Examiner—Stafford Schreyer
Attorney, Agent, or Firm—Stevens, Davis, Miller & Mosher

[57] ABSTRACT

A calling signal controller in which a calling signal generator having a necessary and minimum output capacity is used to the most efficiently possible extent. The controller includes a phase number memory specifying the total number of phases of calling signals used to selectively call a plurality of telephone sets, a ringing count memory loaded with a ring count for each of the phases, and a ringing control memory of which addresses are associated with the phase numbers and the ringing counts, thereby controlling the calling signals.

4 Claims, 6 Drawing Sheets

CALLING SIGNAL CONTROLLER

BACKGROUND OF THE INVENTION

The present invention relates to a method of and an apparatus for controlling a calling signal or current for use in a private branch exchange (PBX) and/or a key telephone set, the calling signal being transmitted from an extension or intercommunicating circuit to a telephone set.

Heretofore, according to the method of controlling the calling signal of this type, an intercommunication circuit number is related to a phase number of the calling signal with a unique correspondence established therebetween; moreover, a hardware device is employed to supply a synchronization signal representing a first phase of the calling signal.

Figure 5:
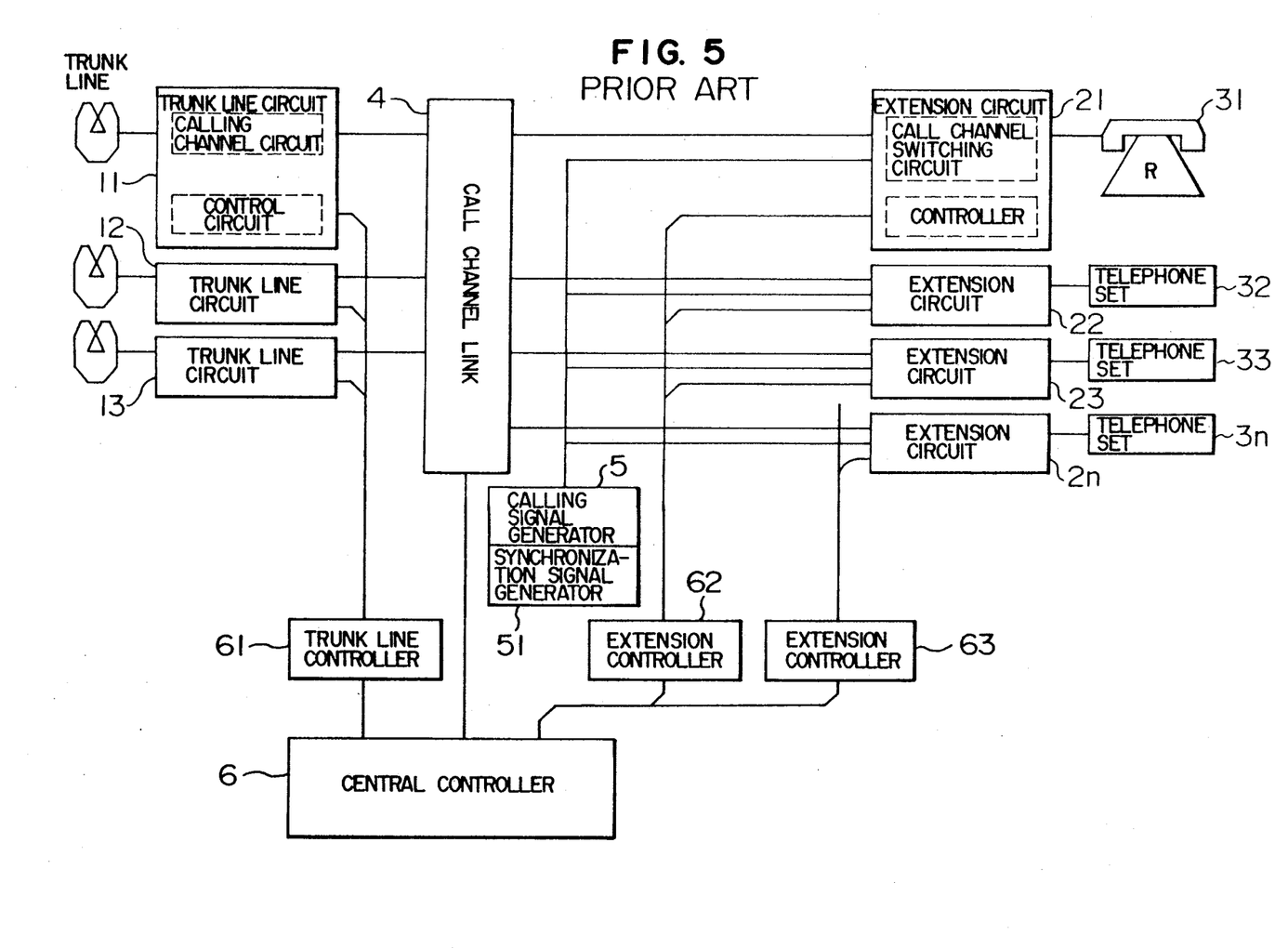
FIG. 5 is a block diagram illustratively showing the constitution of a private branch exchange in the prior art.

FIG. 5 is a block diagram schematically showing the circuit constitution of a private branch exchange and/or a key telephone set.

Figure 6:
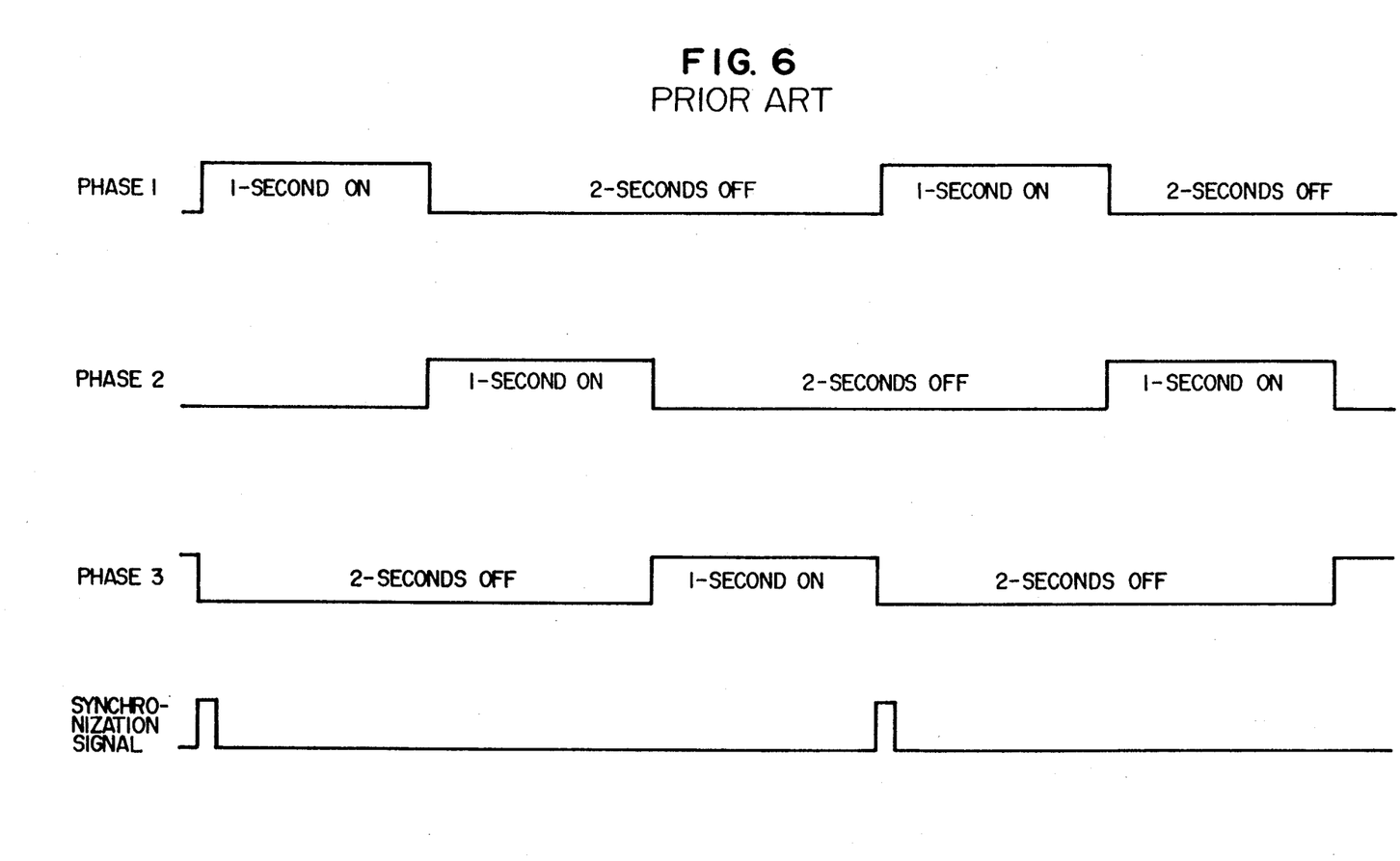
FIG. 6 is a signal timing chart for explaining the operation of the system of FIG. 5.

This constitution includes trunk line circuits 11, 12, and 13, extension circuits 2l to 2n, telephone sets 3l to 3n, a call channel link 4, a calling signal generator 5, a synchronization signal generator 51 supplying extension controllers 62 and 63 with a synchronization signal indicating a start point of the first phase according to a relationship with respect to time shown in FIG. 6, a central controller 6, a trunk line controller 61, and the extension controllers 62 and 63. Table 1 shows correspondence relationships between extension circuit numbers and ringing phases stored in a main memory of each of the extension controllers 62 and 63. The contents of this table are accessed to control the interconnection circuits 2l to 2n.

TABLE 1

| First phase | Second phase | Third phase |
|---|---|---|
| Ext. circuit 21 | Ext. circuit 22 | Ext. circuit 23 |
| Ext. circuit 24 | Ext. circuit 25 | Ext. circuit 26 |
| Ext. circuit 27 | Ext. circuit 28 (Same as above) | Ext. circuit 29 |
| Ext. circuit (3a-2) | Ext. circuit (3a-1) | Ext. circuit 3a |

That is, as can be seen from this table, the correspondences between the extension circuits and the first, second, and third phases are established in a cyclic or periodical manner as 21-first, 22-second, 23-third, 24-first, 25-second . . . .

FIG. 6 is a signal timing chart representing relationships with respect to time between calling signals produced from the calling signal generator 5 and the synchronization signal created from the synchronization signal generator 51. As shown in the signal timing chart of FIG. 6, phase numbers are associated with respective calling signals transmitted sequentially at one second intervals in this example.

A description will now be given of the operation achieved by the conventional system example above.

In the constitution of FIG. 5, for example, when a telephone set 3e (not shown) is set to an off-hook state to call a telephone set 32 through a dialing operation, the central control unit 6 instructs the extension controller 62 to send a calling tone signal to the extension circuit 22. In response thereto, the extension control unit 62 accesses the main memory thereof to acquire the contents of the correspondence table (Table 1), which denotes that the calling signal to be transmitted to the extension circuit 22 is associated with the second sounding phase. In consequence, as shown in FIG. 6, after one second has elapsed from a reception of a synchronization signal from the synchronization signal generator 51, the extension circuit 22 is activated to send to the telephone set 32 the ringing signal for one second and then to interrupt the signal transmission for two seconds. Thereafter, on receiving the synchronization signal again, the operation above is repeatedly accomplished, namely, after one second has elapsed from the reception of the synchronization signal from the generator 51, the extension circuit 22 is controlled to transmit the ringing signal to the telephone set 32 for one second and then to interrupt the signal transmission for two seconds. As a result, the telephone set 32 is caused to sound through the repetitious operations above. That is, the telephone set 32 sounds in accordance with a ringing pattern of 1-second ON (sound) and 2-second OFF (silent).

As above, also in the conventional method of controlling the ringing signal, when the ringing operations are conducted in a random manner, the calling signals thus transmitted are most efficiently distributed to the ringing phases 1 to 3.

Moreover, in the prior art example, the calling signal has a period associated with that of the synchronization signal created from the synchronization signal generator 51, which limits the ringing, pattern to, for example, 1-second ON and 2-second OFF.

However, according to the conventional method of controlling the calling signal, there may possibly occur a situation where the load is concentrated on one of the ringing phases in some cases. In order to overcome this difficulty, the calling signal generator 5 is required to possess an output capacity coping with the centralized load.

For example, assuming here that a calling signal power of one watt (W) is necessary for each extension circuit, when only the extension circuits 21, 4, 27, . . . , (3a-2) undergo a ringing operation, in other words, one third of the total number of the extension circuits are activated for the sounding operation, the calling signal generator 5 is required to supply a power of n/3 watt (n stands for the total number of the telephone sets connected to the calling signal generator 5) for one third of the period. That is, when all telephone sets are to be called, the calling signal generator 5 is required to have an output capacity of n/3 watt. However, in such a case where one third of the telephone sets are subjected to the ringing operation, only a load of n/9 is actually utilized, which leads to a problem of inefficiency.

Furthermore, when the ringing pattern is required to be changed to 1-second ON and 3-second OFF, it is necessary to modify the circuit configuration of the synchronization signal generator 51 so as to supply the extension control units 62 and 63 with synchronization signals having different periods. In addition, there also arises a problem that the contents of the correspondence table (Table 1) are required to be changed in the main memory of each of the extension controllers 62 and 63.

SUMMARY OF THE INVENTION

It is therefore an object of the present invention to provide a method of controlling the transmission of a calling signal in which a calling signal generator with a minimum output capacity is most efficiently utilized and which easily copes with a change in the ringing period, thereby solving the problems of the prior art.

In order to achieve the above object, according to the present invention, the calling signals are classified in association with a plurality of phases and ringing counts so as to transmit the calling signals based on the ringing phases thus assigned thereto. Moreover, specifically, there are disposed an extension controller for driving an extension circuit transmitting a calling signal to a telephone set, a phase number memory for specifying the total phase numbers of the calling signals, a ringing count memory for storing therein a ringing count of each phase, and a ringing control memory including addresses associated with the total phase numbers and ringing counts of the associated calling signals.

Consequently, in accordance with the present invention, since the calling signals are classified depending on a plurality of phase numbers and the ringing counts are controlled for each phase, the occurrence of an excessive load is prevented from taking place in the calling signal generator. Consequently, the output capacity of the calling signal generator ca be efficiently used to the maximum extent. More concretely, each of the calling signals is classified by the total phase number specified by the phase number memory and the ringing count loaded in the ringing number memory such that the relationships therebetween are controlled by the ringing control memory, thereby driving the extension circuits via the extension controllers. Consequently, in addition to the prevention of the excessive load on the calling signal generator, since the contents of the phase number memory can be varied to change the maximum number of the system phase signals, the ringing period is arbitrarily changed. In addition, even when the capacity of the calling signal generator is varied, the system configuration can be easily altered by changing the values stored in the ringing count memory.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENT

Figure 1:
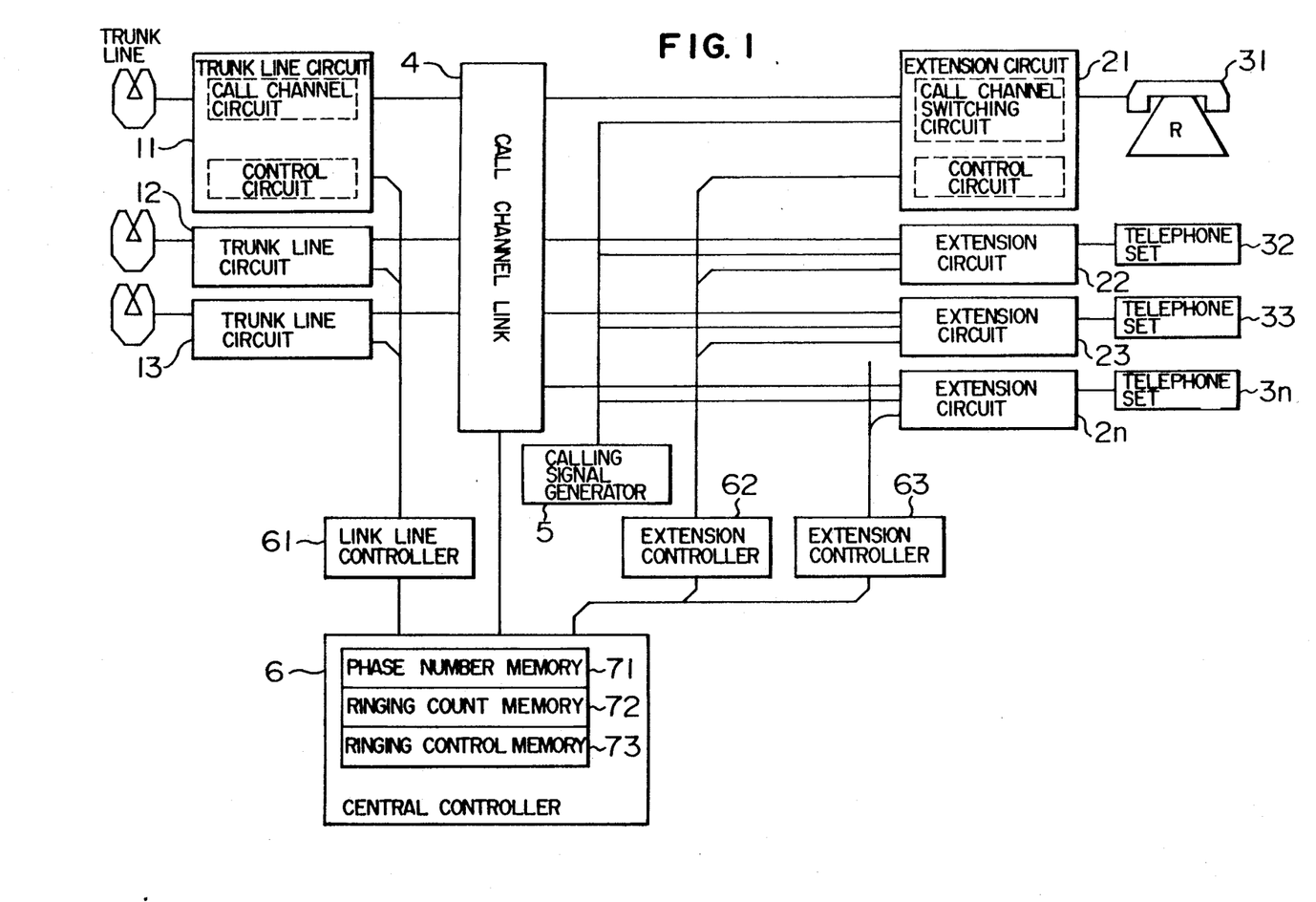
FIG. 1 is a schematic block diagram showing the configuration of a private branch exchange employing a calling signal control method in a embodiment according to the present invention.

FIG. 1 shows the functional structure of an embodiment according to the present invention. The configuration of FIG. 1 includes trunk line circuits 11 to 13, extension circuits 2*l* to 2n, telephone sets 3*l* to 3n, a call channel link 4, a calling signal generator 5, a central controller 6, a link line controller 6, extension controllers 62 and 63, a ringing count memory 72, and a ringing control memory. Naturally, the phase number memory 71, the ringing count memory 72, and the ringing control memory can be loaded in the main memory of the central controller 6.

The operation of the embodiment will now be described. Let us assume here that the values respectively of the phase number memory 71 and the ringing count memory 72 are four and three, respectively.

When the private branch exchange is powered, the central controller 6 achieves a control to set the contents of the phase number memory 71 to the extension controllers 62 and 63.

Figure 2:
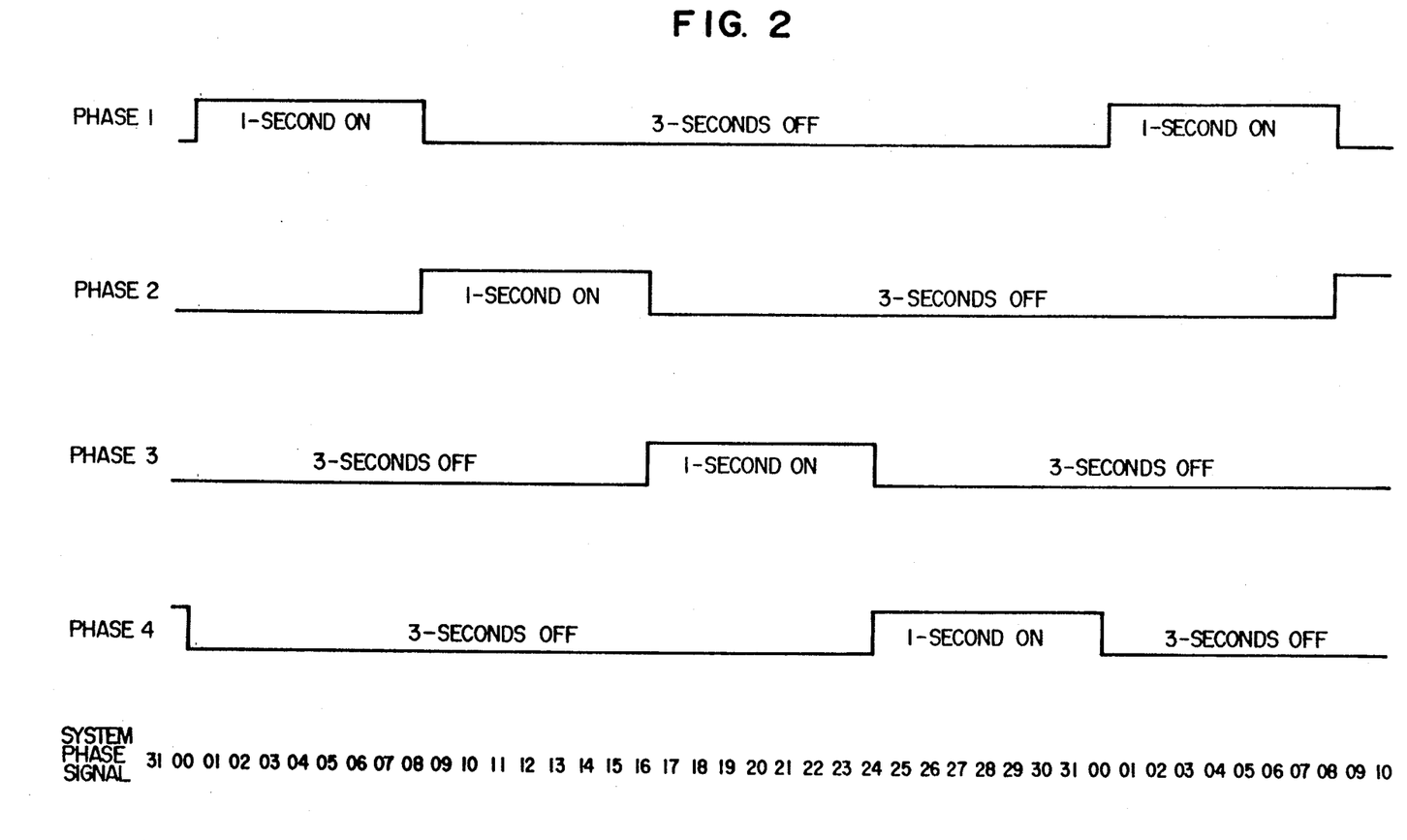
FIG. 2 is a signal timing chart useful to explain the operation of the system of FIG. 1.

In addition, based on the value "four" obtained from the phase number memory 71, the calling signals are assumed to be assigned to the phases 1 to 4 as shown in FIG. 2 such that the value of the system phase signal is incremented for each 125 milliseconds (ms) to supply data of which the number is indicated by (value of phase number memory 71)$\times 8 - 1 = 31$, namely, data associated with signals 0 to 31. Moreover, since the phase number memory 71 and the ringing count memory 72 are respectively loaded with the values four and three, a ringing control memory 73 is beforehand generated to control extension circuits, namely, three circuits for each of the phases 1 to 4 as shown in Table 2.

TABLE 2

| Address | Data | Address | Data | Address | Data Description |
|---|---|---|---|---|---|
| 01 | 0 | 02 | 0 | 03 | 0 Phase 1 ringing capacity (=3) |
| 04 | 0 | 05 | 0 | 06 | 0 Phase 2 ringing capacity (=3) |
| 07 | 0 | 08 | 0 | 09 | 0 Phase 3 ringing capacity (=3) |
| 10 | 0 | 11 | 0 | 12 | 0 Phase 4 ringing capacity (=3) |

Figure 3:
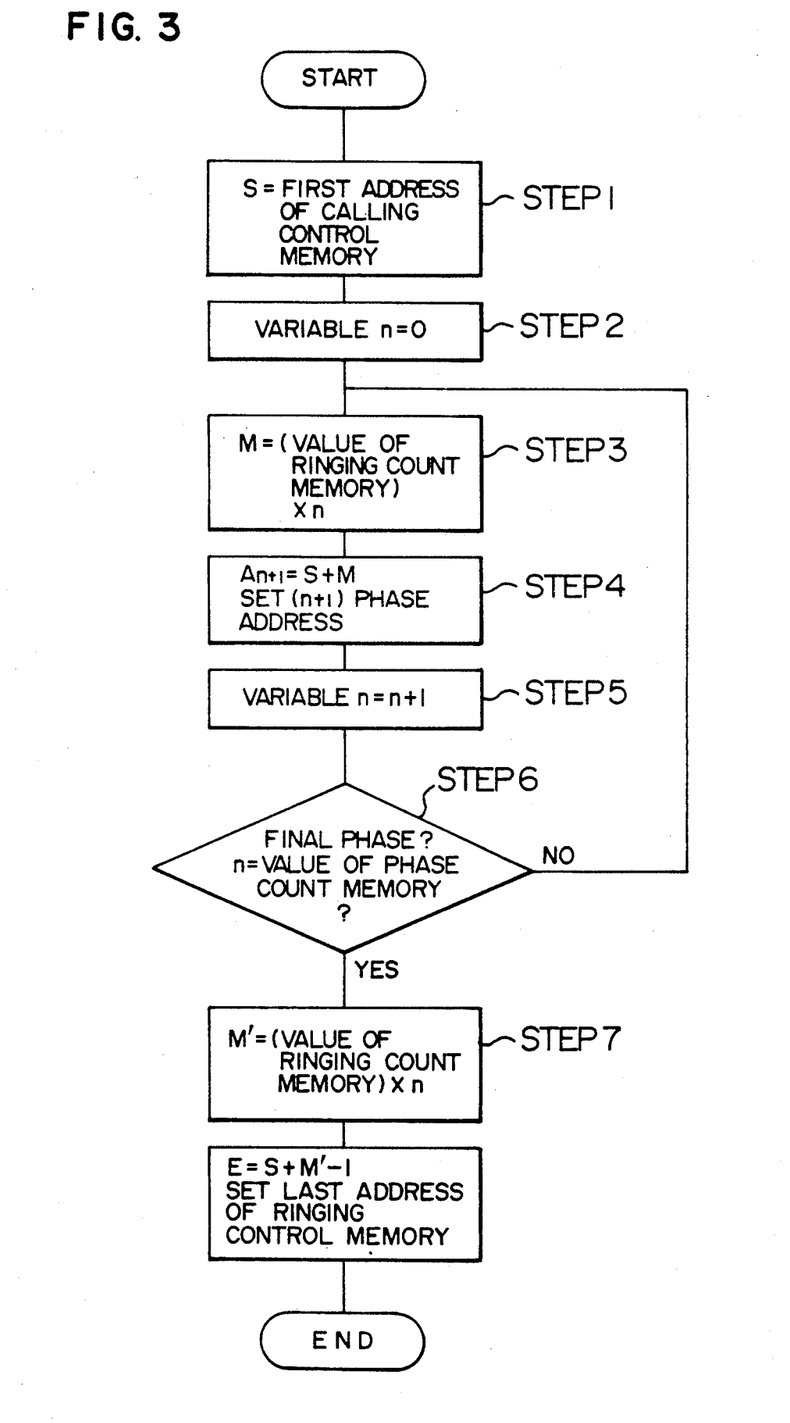
FIGS. 3 and 4 are flowcharts showing operations achieved by the configuration of FIG. 1.

FIG. 3 is a flowchart showing the operation in which the ringing control memory 73 is produced. First, a start address (S) of the ringing control memory 3 is initialized in a step 1. Let us assume that an address value "01" is set as the first address. A variable n is set to 0 in a step 2 and then a computation of "Value of ringing count memory 72" $\times n$ (M). Since n has been initialized to 0, this results in M=0. In a step 4, a computation is achieved to attain an (n+1) phase address ($A_{n+1}$), namely, since $A_{n+1} = S + M$, the computation is achieved as $A_1 = 1 + 0 = 1$. A step 5 changes the content of the variable to be n+1 and then a step 6 checks to decide whether or not the resultant value of the variable n is equal to the value stored in the phase number memory 71. If this is the case, a final phase is assumed; otherwise, the pertinent phase is considered to be other than the final phase. Since n+1=1 in this stage, the value of the phase number memory 71 is attained as four, the pertinent phase is judged to be other than the final phase. In consequence, control is returned to the step 3 to repeatedly accomplish the processing above. In other words, the step 3 computes $M = 3 \times 1 = 4$ and then the step 4 achieves a calculation $A_2 = 1 + 3 = 4$ i.e. the first address of the second phase is determined to be four. Similarly, the start addresses respectively of the third and fourth phases are obtained as seven and ten, respectively. In the step 6, when n=4 results, the pertinent phase is assumed to be the final phase and hence control proceeds to step 7, which in turn computes "Value of ringing count memory 72" $\times n = M'$. In this example, $M' = 3 \times 4 = 12$ such that the end address E of the ringing control memory 73 is set as $E = S + M' - 1 = 1 + 12 - 1 = 12$.

Through the operation above, the system creates the ringing control memory as shown in Table 2.

The operation of the configuration of FIG. 1 will next be described.

Figure 4:
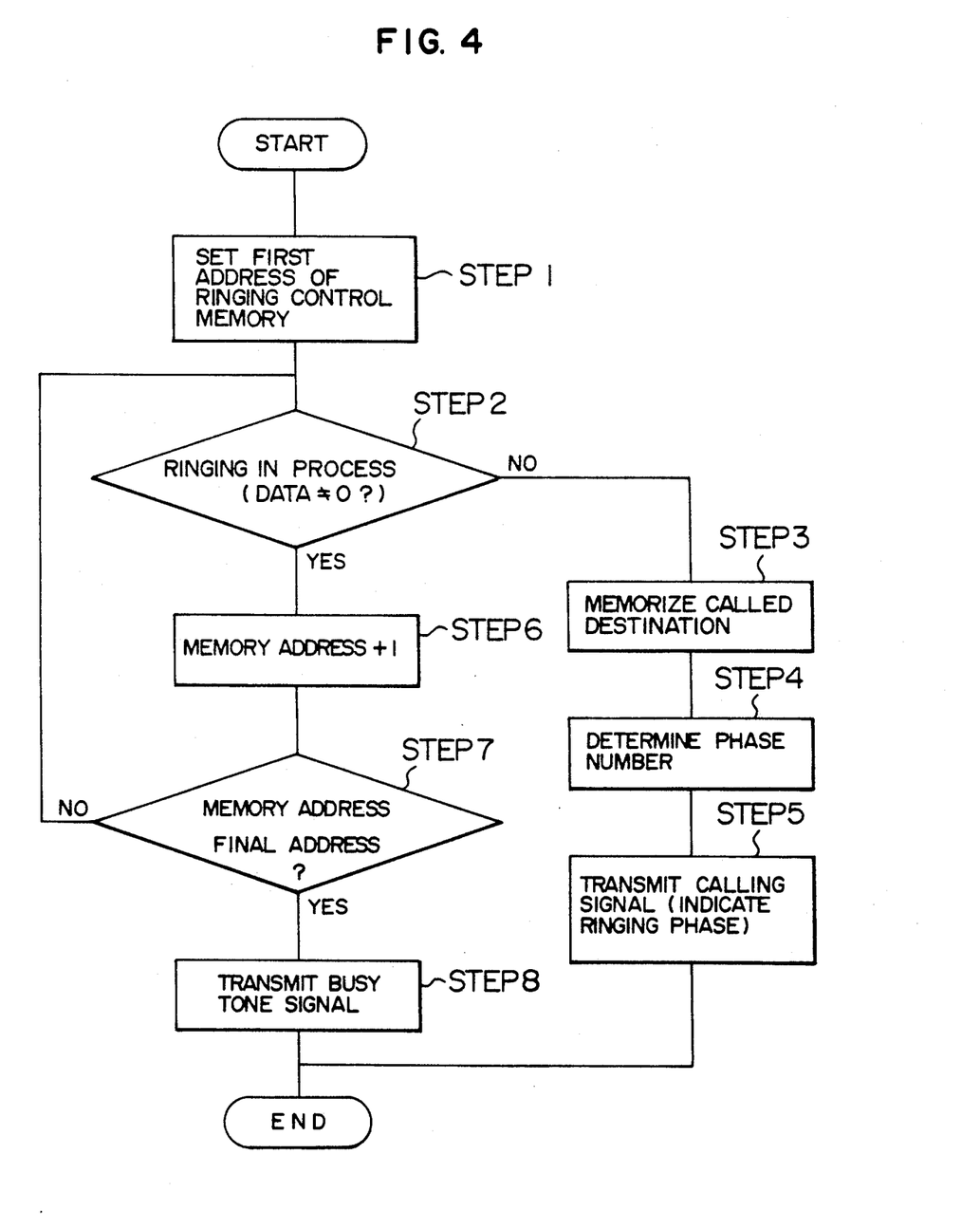

As an operation example, let us consider a case where the user takes up the telephone set 31, which is resultantly set to the off-hook state, and then dials a number to ring up the telephone set 32. In response thereto, the central controller 6 accesses the data "0" at an address "01" of the ringing control memory 73 to detect a free space in the first phase. Data "2" loaded in the extension circuit number field is then stored in a field at an address "01" of ringing control memory 73. The central controller 6 issues an instruction to the extension control unit 62, which then causes the extension circuit 22 to send a ringing signal in the first phase. FIG. 4 is a flowchart showing the operation of the control flow accomplished by the central controller 6 in the processing above.

First, a step 1 is executed to set the first address of the ringing control memory 73 and then a step 2 checks to determine whether or not a field indicated by the address contains data "0", namely, whether or not the address is being used for a ringing operation. Assuming now that the field at the start address "01" thereof contains data "0" i.e. the field is empty, a step 3 memorizes an extension circuit number "2" of the telephone set 32 in the field at the address "01". Thereafter, a step 4 determines that the address "01" is related to the first phase. A step 5 sends an instruction with a report of the first ringing phase to the extension controller 62 to send a ringing signal in the first phase, thereby transmitting the ringing signal in the first phase to the telephone set 32.

On the other hand, when the address "01" of the ringing control memory 73 is found to be in use for a ringing operation in the step 2, a step 6 increments the reference memory address by one. A step 7 checks to determine whether or not the resultant memory address is larger than the final address, namely, an address "12" in the example of Table 2. In this case, the reference address i.e. the address "02" is smaller than the final address. Consequently, the processing returns to the step 2 to decided whether or not the address "02" is being used for a ringing operation. The processing above is similarly accomplished in a repetitious manner such that when an obtained address indicates an empty field, data denoting an extension circuit number of the destination telephone set is stored in the field, thereby ringing the telephone set.

When the step 7 determines that the reference memory address is larger than the final address, it is assumed that all addresses are related to fields being currently used for ringing operations. Consequently, a step 8 is executed to send a busy tone signal to the transmission side, thereby reporting the busy condition of the destination telephone set.

The extension control unit 62 analyzes values of system phase signals received at an interval of 125 ms based on the relationships between calling signals, ringing phases, and system phase signal values loaded in the main memory thereof as shown in Table 3.

TABLE 3

|  | Phase 1 | Phase 2 | Phase 3 | Phase 4 |
| --- | --- | --- | --- | --- |
| System phase signal value | 00 | 08 | 16 | 24 |

When transmitting a calling signal in the phase 1, the extension controller 62 achieves a control over the extension circuit 22 for one second immediately after the system phase signal takes a value "00" so as to transmit the calling signal to the telephone set 32. In consequence, the telephone set 32 rings in response to the calling signal in a ringing pattern 1-second ON and 3-second OFF.

In a similar fashion, when sending a calling signal by using the phase 2, the extension controller 62 controls the extension circuit 22 such that the calling signal is transmitted immediately after the system phase signal takes a value "08". Similarly, when using the phases 3 and 4, the extension control unit 62 accomplishes a control operation to cause the calling signal transmission to be initiated immediately after the system phase signal takes a value "16" and "24", respectively.

Next, in a case where the user takes up the telephone set 33 to dial a number for a call to the telephone set 3n, the central controller 6 similarly accesses the ringing control memory 73 to obtain data "0" at an address "02" thereof so as to detect an available space in the first phase. Data "n" of the extension circuit number is then loaded in a field at an address "02" of the ringing control memory 73, thereby instructing the extension controller 63 to transmit the calling signal in the first phase.

The extension control unit 63 similarly analyzes values of system phase signals received at an interval of 125 ms depending on the correspondences between system phase signals and ringing phases stored in the main memory thereof. That is, the extension controller 62 controls the extension circuit 2n for one second immediately after the system phase signal takes a value "00" to transmit the calling signal to the telephone set 3n. In the system phase signal transmission, an identical value is sent from the central control unit 6 at an identical timing to the extension controllers 62 and 63, which consequently achieve operations in a synchronized fashion.

In the embodiment above, the ringing control memory 73 is employed such that a field search is sequentially conducted therethrough to detect an empty field address in a field-by-field manner, thereby controlling up to 12 ringing operations. When all addresses are used up for the ringing operations, the output capacity of the calling signal generator 5 is three watts, namely, the utilization efficiency is 100% in this state.

As can be seen from the embodiment according to the present invention, there can be attained the following advantageous effects.

(1) Since the central controller supervises the ringing count for each phase, a disadvantageous excessive load can be prevented from occurring in the calling signal generator; moreover, the output capacity of the calling signal generator can be effectively used to the maximum extent.

(2) Even when the capacity of the calling signal generator is altered, only if the content of the ringing count memory is changed in the central controller, the size of the ringing control memory is automatically varied when the system is powered, which facilitates modification of the system constitution.

(3) Even when the total number of phases is desired to be changed for the calling signal, the user need only change the content of the ringing count memory in the central controller. Namely, the size of the ringing control memory is varied automatically when the system is powered. On the other hand, the maximum value of the system phase signal is altered for a synchronization with extension controllers, thereby easily coping with the change in the total number of ringing phases.

While the particular embodiment of the invention has been shown and described, it will be obvious to those skilled in the art that various changes and modifications may be made without departing from the present invention in its broader aspects.

We claim:

1. A calling signal controller comprising:
a calling signal generator for transmitting calling signals to telephone sets through extension circuits; and
a central controller comprising:
a phase number memory for specifying a total number of phases of the calling signals, each of the phases having a maximum ringing count;
a ringing count memory for storing therein a ringing count for each of the phases;
a ringing control memory having addresses associated with the total number of the phases and the ringing count for each of the phases; and
means for determining whether the ringing count of a phase equals the maximum ringing count of the phase and, if so, setting an extension number to a next phase in said ringing control memory, thereby supervising the ringing count for each phase to limit output capacities of the calling signals using said ringing count memory and prevent an excessive load on said calling signal generator.

2. A calling signal controller comprising:
a calling signal generator for transmitting calling signals to telephone sets through extension circuits; and
a central controller comprising:
a phase number memory for specifying a total number of phases of the calling signals;
a ringing count memory for storing therein a ringing count for each of the phases;
a ringing control memory having addresses associated with the total number of the phases and the ringing count of each of the phases; and
means for changing a size of the ringing control memory according to a content of said ringign count memory and for changing a system configuration when the calling signal controller is powered.

3. A calling signal controller comprising:
a calling signal generator for transmitting calling signals to telephone sets through extension circuits;
extension controllers for selectively driving and controlling said extension circuits; and
a central controller comprising:
a phase number memory for specifying a total number of phases of the calling signals;
a ringing count memory for storing a ringing count of each of the phases;
a ringing control memory having addresses associated with the total number of the phases and the ringing count of each of the phases; and
means for changing contents of the phase number memory and a size of the ringing control memory when the calling signal controller is powered and for changing a maximum value of the ringing count of each phase and synchronizing with said extension controllers to change a phase number of a calling signal.

4. A calling signal controller comprising:
(a) a calling signal generator for transmitting calling signals to telephone sets through a plurality of extension circuits;
(b) a plurality of extension controllers for selectively driving and controlling said extension circuits; and
(c) a central controller comprising:
(i) a phase number memory for specifying a total number of phases of the calling signals;
(ii) a ringing count memory for storing therein a ringing count for each of the phases;
(iii) a ringing control memory having addresses associated with the total number of the phases and the ringing count of each of the phases, one of the addresses being a start address having a phase number and another one of the addresses being a final address; and
(iv) means for responding to a call initiated by a telephone by executing the instructions of:
(A) determining whether or not the start address of the ringing control memory is in use for a ringing operation;
(B) if the start address is not in use, detecting the phase number of the address, setting a reference memory address equal to the start address, and performing a calling operation of issuing an instruction to a one of the extension controllers corresponding to a dialed number to transmit the calling signal to a telephone set through a one of the extension circuits corresponding to the dialed number using the phase number of the reference memory address;
(C) if the start address is in use, executing the further instructions of:
(D) incrementing the reference memory address by one;
(E) performing a determine operation of determining whether or not the reference memory address is in use if the address is smaller than the final address;
(F) if the reference memory address is not in use, accomplishing said calling operation, and transmitting the calling signal to a telephone set corresponding to the dialed number;
(G) if the reference memory address is in use, doing at least one iteration of incrementing the reference memory address by one and performing said determine operation until the reference memory address reaches a value that is not in use, and thereupon storing extension circuit number data of the dialed number and transmitting a calling signal to a telephone corresponding to the dialed number; and
(H) if there is no empty field up to the final address, sending a busy tone to the sending telephone.

* * * * *